US012727600B2

(12) United States Patent
Yang et al.

(10) Patent No.: US 12,727,600 B2
(45) Date of Patent: Sep. 8, 2026

(54) STAUROSPORINE•EMAMECTIN BENZOATE SUSPENDING AGENT AND PREPARATION METHOD AND APPLICATION THEREOF

(71) Applicants: PLANT PROTECTION RESEARCH INSTITUTE OF GUANGDONG ACADEMY OF AGRICULTURAL SCIENCE, Guangzhou (CN); GUANGDONG BRANCH OF CHINA TOBACCO GENERAL CO., LTD., Guangzhou (CN)

(72) Inventors: Qiyun Yang, Guangzhou (CN); Birun Lin, Guangzhou (CN); Xiaoming Pu, Guangzhou (CN); Zheng Lu, Guangzhou (CN); Huifang Shen, Guangzhou (CN); Yonghua Lv, Guangzhou (CN); Jingxin Zhang, Guangzhou (CN); Dayuan Sun, Guangzhou (CN)

(73) Assignees: PLANT PROTECTION RESEARCH INSTITUTE OF GUANGDONG ACADEMY OF AGRICULTURAL SCIENCES, Guangzhou City (CN); GUANGDONG BRANCH OF CHINA TOBACCO GENERAL CO., LTD., Guangzhou City (CN)

( * ) Notice: Subject to any disclaimer, the term of this patent is extended or adjusted under 35 U.S.C. 154(b) by 895 days.

(21) Appl. No.: 18/279,358

(22) PCT Filed: Oct. 13, 2020

(86) PCT No.: PCT/CN2020/120556

§ 371 (c)(1),
(2) Date: Aug. 29, 2023

(87) PCT Pub. No.: WO2021/196560

PCT Pub. Date: Oct. 7, 2021

(65) Prior Publication Data

US 2024/0215581 A1 Jul. 4, 2024

(30) Foreign Application Priority Data

Apr. 1, 2020 (CN) ........................ 202010250137.8

(51) Int. Cl.
*A01P 7/04* (2006.01)
*A01N 25/04* (2006.01)
*A01N 43/90* (2006.01)
*A01P 17/00* (2006.01)

(52) U.S. Cl.
CPC ............ *A01N 43/90* (2013.01); *A01N 25/04* (2013.01); *A01P 7/04* (2021.08); *A01P 17/00* (2021.08)

(58) Field of Classification Search
CPC . A01N 43/90; A01N 25/04; A01P 7/04; A01P 17/00
See application file for complete search history.

(56) References Cited

U.S. PATENT DOCUMENTS

| | | | | |
|---|---|---|---|---|
| 4,735,939 A * | 4/1988 | McCoy | .................. | A01N 43/90 514/211.08 |
| 2013/0157853 A1* | 6/2013 | Olds | ..................... | A01N 25/04 504/105 |
| 2015/0329435 A1* | 11/2015 | Hardy | .................... | A01N 65/06 424/581 |

FOREIGN PATENT DOCUMENTS

| | | | | |
|---|---|---|---|---|
| CN | 1097761 A | 1/1995 | | |
| CN | 102925511 A | 2/2013 | | |
| CN | 104663679 A * | 6/2015 | | |
| CN | 104736144 A | 6/2015 | | |
| CN | 105145553 A * | 12/2015 | | |
| CN | 107660548 A * | 2/2018 | ............ | A01N 43/90 |
| CN | 108348894 A | 7/2018 | | |
| CN | 108676757 A | 10/2018 | | |
| CN | 108739825 A | 11/2018 | | |
| CN | 109479876 A * | 3/2019 | ............ | A01N 47/34 |
| CN | 110642872 A | 1/2020 | | |
| CN | 111296417 A | 6/2020 | | |

OTHER PUBLICATIONS

Xiao-Ming et al., Insecticidal Constituent of *Streptomyces* sp. 4138 and the Bioactivity agains Spodoptera exigua, Aug. 5, 2008, vol. 24, No. 02 english machine translation (Year: 2008).*

Neopelex, 2025 [retrieved Oct. 28, 2025], https://jlaichem.com/product/neopelex-f-65/ (Year: 2025).*

Oka et al., Staurosporine, a Potent Platelet Aggregation Inhibitor from a *Streptomyces* Species, 1998, Agricultural and Biological Chemistry, vol. 50, No. 11, p. 2723-2727 (Year: 1998).*

Villiers, M., A Practical Guide to Contemporary Pharmacy Practice, 2009, Edition 3, Chapter 20, p. 251-256 (Year: 2009).*

(Continued)

*Primary Examiner* — Walter E Webb
*Assistant Examiner* — Colman Thomas Welles
(74) *Attorney, Agent, or Firm* — MUNCY, GEISSLER, OLDS & LOWE, P.C.

(57) ABSTRACT

A staurosporine-emamectin benzoate suspending agent and a preparation method and application thereof. The suspending agent contains staurosporine and emamectin benzoate. Among them, the mass ratio of staurosporine to emamectin benzoate is 1-9:9-1. The suspending agent in the present invention can be prepared by adding an appropriate amount of wetting agent, dispersing agent, wetting & dispersing agent, thickener, stabilizer, antifreeze, pH adjuster and defoaming agent into staurosporine and emamectin benzoate. The preparation is highly efficient, low-toxic and pollution-free. After being sprayed, it is distributed on the surface of crops as fine particles, which is more conducive to the direct control of pests, can reduce the dosage of emamectin benzoate, enhance the effect of pest control, and effectively delay the resistance.

9 Claims, 1 Drawing Sheet

(56) References Cited

OTHER PUBLICATIONS

Wei, A method for evaluating the toxicity interaction of binary mixtures, 2020, MethodsX, vol. 7, 101029) (Year: 2020).*
Pu, Xiaoming et al. , "Insecticidal Constituent of *Streptomyces* sp.4138 and the Bioactivity against Spodoptera exigua", vol. 24, No. 02, May 8, 2008 (May 8, 2008).

* cited by examiner

STAUROSPORINE•EMAMECTIN BENZOATE SUSPENDING AGENT AND PREPARATION METHOD AND APPLICATION THEREOF

TECHNICAL FIELD

The invention belongs to the technical field of plant protection and pesticides, and particularly relates to a Staurosporine·Emamectin benzoate suspending agent and a preparation method and an application thereof.

BACKGROUND

Beet armyworm, also known as *Spodoptera exigua*, is commonly known as Cabbage Brown *Spodoptera*, belonging to the *Lepidoptera* Noctuidae. It mainly harms cruciferous, solanaceae, beans and other vegetables. In recent years, its damage to vegetables and other crops has become more serious. In order to reduce the harm of insects, farmers have used highly toxic chemicals to control them for a long time. The continuous increase in the dosage and frequency for using pesticide by farmers has led to a rapid increase in the resistant level of beet armyworm and a decline in the control effect. At the same time, it also has an impact on the quality and safety of agricultural products. In order to find a green and environmentally friendly method to control beet armyworm pests, researchers have explored low-toxic pesticides and biological pesticides to control it. They hope to find a compounding method of biochemical pesticides to improve the control effect and reduce the use of chemical pesticides so as to provide a new option for the control of beet armyworm.

Emamectin benzoate is a new type of high-efficiency antibiotic insecticide and acaricide synthesized from abamectin B1. Emamectin benzoate has a very good control effect on lepidopteran pests such as *Pieris rapae* and *Helicoverpa armigera*. The product is successfully developed by Merk&Co. of the United States in 1984, and is currently widely used in production. Staurosporine is an antibiotic produced by the fermentation of *Streptomyces* strains, which has a certain control effect on pests. But so far, there is no related report on the compounding of Staurosporine and Emamectin benzoate before being used to control beet armyworm.

SUMMARY

A primary purpose of the present invention is to overcome the shortcomings and deficiencies of the prior art and provide a Staurosporine·Emamectin benzoate suspending agent.

Another purpose of the present invention is to provide a preparation method of the Staurosporine·Emamectin benzoate suspending agent.

Another purpose of the present invention is to provide an application of the Staurosporine·Emamectin benzoate suspending agent.

The purpose of the present invention is achieved by the following technical solution: a Staurosporine·Emamectin benzoate suspending agent comprising Staurosporine and Emamectin benzoate, wherein the mass ratio of Staurosporine to Emamectin benzoate is (1-9):(9-1).

The mass ratio of the Staurosporine to Emamectin benzoate is preferably (3-9):(7-1), more preferably (4-9):(6-1), even more preferably (7-9):(3-1), and most preferably 4:6, 7:3 or 9:1.

The Staurosporine·Emamectin benzoate suspending agent may also contain at least one of a wetting agent, a dispersing agent, a wetting and dispersing agent, a thickener, a stabilizer, an antifreeze, a pH adjuster, and a defoaming agent.

The total mass of the effective ingredients Staurosporine and Emamectin benzoate in the Staurosporine·Emamectin benzoate suspending agent accounts for 2% to 4% of the mass percentage of the Staurosporine·Emamectin benzoate suspending agent.

The wetting and dispersing agent can be used as both a wetting agent and a dispersing agent, and is preferably sodium dodecylbenzene sulfonate.

The thickener is preferably xanthan gum.

The stabilizer is preferably linseed oil.

The antifreeze is preferably ethylene glycol.

The pH adjuster is preferably glacial acetic acid.

The defoamer is preferably foam enemy.

The Staurosporine·Emamectin benzoate suspending agent preferably contains the following components in terms of mass percentage: 22.50%-40% of 8% Staurosporine emulsifiable concentrate, 0.4%-1.8% of 50% Emamectin benzoate, 5% of the wetting and dispersing agent, 1% of the thickener, 0.5% of the stabilizer, 1% of the antifreeze, 0.5% of the pH adjuster, and 0.2% of the defoamer, with the balance being deionized water.

The 8% Staurosporine emulsifiable concentrate is preferably consisted of the following components in terms of mass percentage: 8% of Staurosporine, 5% of Tween 80, and 87% of n-butanol.

The 50% Emamectin benzoate is a commercially available 50% Emamectin benzoate (that is, the mass fraction of Emamectin benzoate is 50%).

The preparation method of the Staurosporine·Emamectin benzoate suspending agent includes the following steps:

Mixing Staurosporine and Emamectin benzoate evenly, then adding a wetting and dispersant, a thickener, a stabilizer, an antifreeze, a pH adjuster, a defoamer and a deionized water, and stirring to obtain a mixture; then grinding and pulverizing the mixture to obtain the Staurosporine·Emamectin benzoate suspending agent.

The grinding and pulverizing preferably adopts a grinder or a ball mill.

The time for the grinding and pulverizing is preferably 6 hours.

The Staurosporine·Emamectin benzoate suspending agent is mainly used to control pests.

The pests include *Lepidoptera* pests, and are preferably beet armyworm.

Compared with the prior art, the present invention has the following advantages and effects:

(1) In the present invention, water is used instead of a organic solvent, so that the effective ingredients are uniformly dispersed in water with a particle size of 4 μm or less to form an off-white preparation, the process is simple, and the production cost is low. After spraying, the preparation is distributed on the surface of crops as fine particles, which is more conducive to directly controlling pests and improving the efficacy of the pesticide.

(2) The Staurosporine·Emamectin benzoate suspending agent prepared by the present invention is highly efficient, low-toxic and non-polluting. Mixing Staurosporine and Emamectin benzoate can reduce the dosage of Emamectin benzoate, enhance the control effect, and effectively delay pesticide resistance. Therefore, compounding Staurosporine with Emamectin benzoate has good practical significance.

DETAILED DESCRIPTION OF THE EMBODIMENTS

Figure 1:
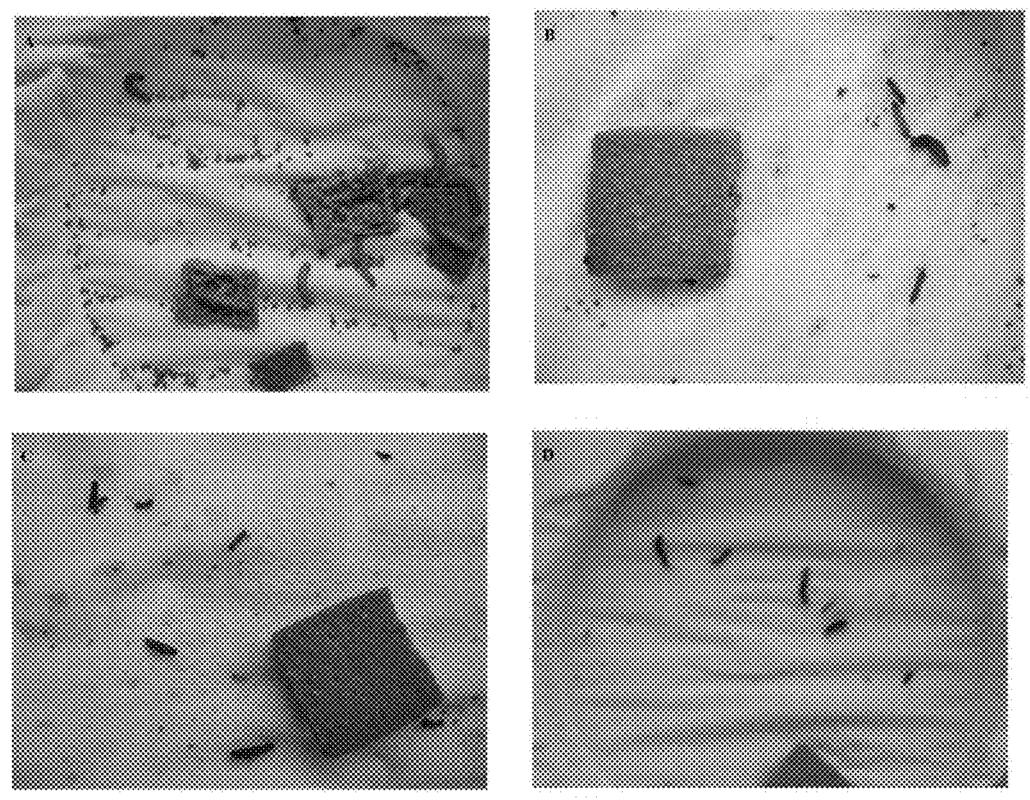
FIG. 1 is the effect diagram of the beet armyworm after being treated with different pesticides, wherein A is the beet armyworm treated with clean water; B is the beet armyworm treated with 1% of Emamectin benzoate emulsifiable concentrate, C is the beet armyworm treated with Staurosporine, and D is the beet armyworm treated with 2% Staurosporine·Emamectin benzoate suspending agent.

The present invention will be further described in detail below in conjunction with examples, but the embodiments of the present invention is not limited thereto. Unless otherwise specified, the pesticides, methods, and equipments used in the present invention are conventional reagents, methods, and equipments in this technical field. Unless otherwise specified, all pesticides used in the present invention are commercially available.

Unless otherwise specified, the percentages (%) in the present invention are all mass percentages.

The method for determining the indoor toxicity of the pesticides involved in the present invention to the second instar larvae of *Spodoptera exigua* is as follows:

The test method is the Potter spray method: a Potter spray tower is used to spray the vegetable leaves on both sides with 1 mL of the amount of the pesticides treating the leaf on each side, and the sedimentation is performed for 30 seconds. There are 3 replicates for each treatment for 30 larvae (2nd instar larvae of *Spodoptera exigua*), and a treatment with the clean water is used as the control. The petri dish after sprayed is placed in a constant-temperature incubator (temperature being 25° C., relative humidity being 85%). The death of the testing pests is investigated and recorded after treatment for 24, 48, and 72 hours. During the treatment, the petri dish is kept moist, and fresh Cantonese cabbage leaves are added timely as pest's food.

The formula (1) is used to calculate the mortality of pests, the Abbott formula is used to calculate the corrected mortality, and EXCEL is used to analyze the virulence regression results. Formula (2) is the calculation formula of Abbott.

Mortality (%)=Number of dead insects/Number of testing worms before experiment*100 (1)

Abbott formula as a calculation formula is as follows:

Corrected mortality (%)=(Mortality in the experimental group−Mortality of the control group)/(1−Mortality of the control group)*100 (2)

Example 1 Determining the Best Formulation of a Mixed Agentia

The method reported by Sun. Y. P (1960) is used to determine the best formulation of the compounding agentia. The details are as follows.

The single-dose concentration gradient is configured as follows: first, the Staurosporine (i.e. 8% Staurosporine emulsifiable concentrate, being consisted of the following components in terms of mass percentage: 8% of Staurosporine, 5% of Tween 80, and 87% of n-butanol) and the 50% Emamectin benzoate original pesticide (Xingyu Biological Technology Development Co., Ltd., Jiamusi City, Heilongjiang Province, China) are diluted into a certain concentration of liquid pesticide (mother liquid 1:100), and then they are mixed in 9 different ratios of the Staurosporine to the Emamectin benzoate such as 1:9, 2:8, 3:7, 4:6, 5:5, 6:4, 7:3, 8:2, and 9:1. The concentration gradient of the mixtures in all formulating ratios is obtained, and the median lethal concentrations ($LC_{50}$) of each mixture for the second instar larvae of *Spodoptera exigua* ($LC_{50}$) are determined, and the individual Staurosporine (10:0) and the individual Emamectin benzoate (0:10) are set as experimental controls. Then, the toxicity index is used to calculate the combined toxicity of the (A+B) mixture, where A represents Staurosporine and B represents Emamectin benzoate.

Toxicity index (TI)=($LC_{50}$ of the standard single agentia/$LC_{50}$ of the agentia for test)×100 (3)

wherein, the standard single agentia is Staurosporine or Emamectin benzoate; and the agentia for test is the mixed agentia of Staurosporine with Emamectin benzoate.

Toxicity index (TI) of actual($A$+$B$)=($LC_{50}$ of the standard single agentia/$LC_{50}$ of ($A$+$B$))×100 (4)

Toxicity index (TI) of theoretical($A$+$B$)=Toxicity index (TI) of $A$×percentage of $A$ in the mixed agentia+Toxicity index (TI) of $B$×percentage of $B$ in the mixed agentia (5)

Co-toxicity coefficient (CTC)=(Toxicity index (TI) of actual ($A$+$B$)/Toxicity index (TI) of theoretical ($A$+$B$))×100 (6)

If the co-toxicity coefficient (CTC) of the mixed agentia is ≥120, it is synergistic, 80<CTC<120, it is additive, and the co-toxicity coefficient is ≤80, which is antagonism (reported by Wang Xiaoyi, Wang Yuelong, and Ou Xiaoming, The Primary Probe of a Practical Method for Seeking the Optimum Proportion of Pesticide Mixtures, Chinese Journal of Pesticide Science, 2005 Issue 1).

The experimental results are shown in Table 1. The experimental results show that Staurosporine and Emamectin benzoate have a synergistic effect when mixed in a mass ratio (percentage) of 3-9:7-1. Staurosporine and Emamectin benzoate are preferably used in a mass ratio (percentage) of 7-9:3-1. When Staurosporine and Emamectin benzoate are used in a ratio of effective ingredients of 9:1, its co-toxicity coefficient is the highest, reaching 331.11 (seeing Table 1).

TABLE 1

Co-toxicity coefficients of compounds prepared by mixing staurosporine with emamectin benzoate

| Ratio | Virulene regression equation y = ax + b | $LC_{50}$ (μg/ml) | 95% confidence limit | Correlation coefficient r | Co-toxicity coefficients (CTC) |
|---|---|---|---|---|---|
| 10:0 | y = 1.2245x + 3.0346 | 40.28 | 30.17~53.76 | 0.9634 | — |
| 9:1 | y = 1.3538x + 5.5264 | 0.41 | 0.31~0.53 | 0.9241 | 331.11 |
| 8:2 | y = 1.4881x + 5.4062 | 0.53 | 0.42~0.68 | 0.9732 | 130.26 |
| 7:3 | y = 1.6344x + 6.0377 | 0.23 | 0.19~0.29 | 0.9629 | 201.27 |
| 6:4 | y = 1.4762x + 5.8528 | 0.26 | 0.21~0.34 | 0.9722 | 133.92 |
| 5:5 | y = 1.3469x + 5.9338 | 0.20 | 0.15~0.27 | 0.9838 | 139.52 |
| 4:6 | y = 1.9096x + 6.8185 | 0.11 | 0.09~0.14 | 0.9624 | 211.63 |
| 3:7 | y = 1.3356x + 6.0143 | 0.17 | 0.13~0.23 | 0.9836 | 117.47 |
| 2:8 | y = 1.0784x + 5.7742 | 0.19 | 0.14~0.27 | 0.9841 | 92.03 |
| 1:9 | y = 1.6550x + 6.4881 | 0.13 | 0.10~0.16 | 0.9732 | 119.61 |
| 0:10 | y = 2.3393x + 6.9682 | 0.14 | 0.12~1.08 | 0.9878 | — |

Example 2

22.50 grams of 8% Staurosporine EC preparation (being consisted of the following components in terms of mass percentage: 8% of Staurosporine, 5% of Tween 80, and 87% of n-butanol) and 0.4 grams of 50% Emamectin benzoate (Xingyu Biological Technology Development Co., Ltd., Jiamusi City, Heilongjiang Province, China) are mixed uniformly, then 5 grams of sodium dodecylbenzene sulfonate, 1 gram of xanthan gum, 0.5 grams of linseed oil, and 1 gram of ethylene glycol, 0.5 grams of glacial acetic acid (100%), 0.2 grams of foam enemy (polyether defoamer), and 68.9 grams of deionized water are added and stirred evenly to obtain a mixture. The mixture is poured into a grinder (model: FTM-L, 2500 rpm), and ground and pulverized for 6 hours to obtain a 2% Staurosporine·Emamectin benzoate suspending agent.

The 2% Staurosporine·Emamectin benzoate suspending agent refers to the Staurosporine·Emamectin benzoate suspending agent with the total mass percentage of the effective ingredients Staurosporine and Emamectin benzoate being 2%.

Example 3

40 grams of 8% Staurosporine EC (being consisted of the following components in terms of mass percentage: 8% of Staurosporine, 5% of Tween 80, and 87% of n-butanol) and 1.6 grams of 50% Emamectin benzoate (Xingyu Biological Technology Development Co., Ltd., Jiamusi City, Heilongjiang Province, China) are mixed uniformly, then 5 grams of sodium dodecylbenzene sulfonate, 1 gram of xanthan gum, 0.5 grams of linseed oil, 1 gram of ethylene glycol, 0.5 g of glacial acetic acid (100%), 0.2 g of foam enemy and 50.2 g of deionized water are added and stirred evenly to obtain a mixture. The mixture is poured into a grinder (model: FTM-L, 2500 rpm), and ground and pulverized for 6 hours to obtain a 4% Staurosporine·Emamectin benzoate suspending agent.

The 4% Staurosporine·Emamectin benzoate suspending agent refers to the Staurosporine·Emamectin benzoate suspending agent with the total mass percentage of the active ingredients Staurosporine and Emamectin benzoate being 4%.

Example 4

26.25 grams of 8% Staurosporine EC preparation (being consisted of the following components in terms of mass percentage: 8% of Staurosporine, 5% of Tween 80, and 87% of n-butanol) and 1.8 grams of 50% Emamectin benzoate (Xingyu Biological Technology Development Co., Ltd., Jiamusi City, Heilongjiang Province, China) are mixed uniformly, then 5 grams of sodium dodecylbenzene sulfonate, 1 gram of xanthan gum, 0.5 grams of linseed oil, 1 gram of ethylene glycol, 0.5 g of glacial acetic acid (100%), 0.2 g of foam enemy and 63.75 g of deionized water are added and stirred evenly to obtain a mixture. The mixture is poured into a grinder and ground and pulverized for 6 hours to obtain a 3% Staurosporine·Emamectin benzoate suspending agent.

The 3% Staurosporine·Emamectin benzoate suspending agent refers to the Staurosporine·Emamectin benzoate suspending agent with the total mass percentage of the active ingredients Staurosporine and Emamectin benzoate being 3%.

Example of Effects (1) By means of the Potter spray method, the 2% Staurosporine·Emamectin benzoate suspending agent prepared in Example 2 is used to determine the virulence of the second instar larvae of *Spodoptera exigua* according to the above-described method. The virulence regression equation is y=1.6555x+5.8543, the correlation coefficient is r=0.9888, and the $LC_{50}$ is 0.30 μg/mL. This shows that the mixed use of Staurosporine and Emamectin benzoate significantly increases the control effect.

(2) Potted test of the control effect of reagent on beet armyworm Cabbage seedlings with more uniform sizes and 5 leaves are transplanted into flower pots in the net room with 2 seedlings in each pot. Seven days after transplantion, 10 or more the second-instar larvae of beet armyworm with the same size are inoculated in each pot of cabbage seedlings. After 24 hours, the amount of worms on the seedlings is checked, and if there are escapes, repleshment is needed to maintain 10 heads. Pesticide liquids (2% Staurosporine·Emamectin benzoate suspending agent; commercially available 1% Emamectin benzoate EC; and 1% Staurosporine EC (being consisted of the following components in terms of mass percentage: 1% of Staurosporine, 5% of Tween 80, and 94% of n-butanol), with the used concentration being 20 μg/ml) are sprayed on the front and back sides of the leaves and stems with a hand-held sprayer, with clean water as control, until liquids drip from the leaves. Wherein, the concentrations of 2% Staurosporine·Emamectin benzoate suspending agent is 20 μg/ml and 10 μg/ml respectively, and the concentrations of 1% Emamectin benzoate EC are 4 μg/ml and 2 μg/ml. Three potted seedlings are used for each treatment, and three repetitions are set up for each treatment. The number of live insects on the leaves is investigated 1 day, 3 days and 5 days after spraying the pesticide. Insect population reduction rate and control effect are calculated.

Figure 2:
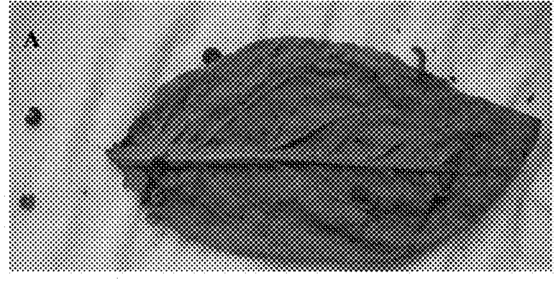
FIG. 2 is the effect diagram of the beet armyworm 1 day after being treated with 2% Staurosporine·Emamectin benzoate, wherein A is the beet armyworm 1 day after being treated with 2% Staurosporine·Emamectin benzoate for 1 day, and B is the blank control.
Figure 2:
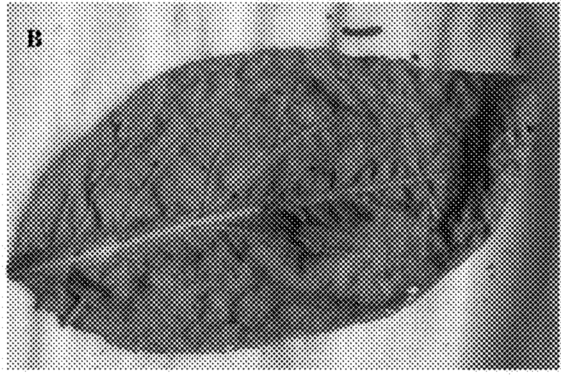

The effect of different pesticides on controlling beet armyworm is shown in FIG. 1 (the effect after treatment for 3 days): the effect of 2% Staurosporine·Emamectin benzoate suspending agent on controlling beet armyworm after 1 day is shown in FIG. 2.

The control effect is shown in Table 2: It can be seen from Table 2 that after spraying the insecticide for 5 days, the 2% Staurosporine·Emamectin benzoate suspending agent at the concentrations of 20 μg/ml and 10 μg/ml has a very good effect on controlling the second instar larvae of *Spodoptera exigua*.

TABLE 2

| Treatment | Concentration (μg/ml) | 1 day | 3 days | 5 days |
|---|---|---|---|---|
| 2% Staurosporine•Emamectin benzoate suspending agent | 20 | 79.1 | 97.1 | 100 |
| | 10 | 66.2 | 86.2 | 93.1 |
| 1% Emamectin benzoate | 4 | 90.4 | 98.3 | 100 |
| | 2 | 78.3 | 91.8 | 99.1 |

There are many methods conventionally used for evaluating the combined effects of pesticides in China. Among them, the co-toxicity coefficient method reported by Sun Yunpei is one of the main methods for evaluating the combined effects of pesticides. This method can not only know whether the mixture is synergistic, but also know the degree of synergy of the mixture. Staurosporine has various mechanisms of action on *Spodoptera exigua*. It can have antifeedant and contact killing effects, and can also have obvious inhibitory effects on the growth, development and reproduction of pests. Its insecticidal activity is high, and its mechanism of action is to induce apoptosis of insects, inhibit amino acid reactions in vivo, inhibit the activities of acetylcholinesterase and other enzymes, and affect the normal allelopathy of insects. Emamectin benzoate is a high-efficiency biological insecticide synthesized on the basis of abamectin. Its mode of action is mainly stomach poison, and it also has contact killing effect. Its insecticidal mechanism is to hinder the motor nerve of pests. Frequent and uncontrolled use of emamectin benzoate can accelerate the development of its resistance. Therefore, speeding up the development of new pesticide varieties and scientifically and rationally mixed use of existing pesticides have become effective means for resistance management and integrated control of pest. The mixed use of two medicaments can increase the mode of action, and can achieve the effects of antifeeding, contact killing and stomach poisoning. At the same time, it diversifies the mechanism of action of the mixture, and long-term use of the mixture can overcome the resistance of pests.

The above-mentioned examples are preferred embodiments of the present invention, but the embodiments of the present invention are not limited by the above-mentioned examples, and any other changes, modifications, substitutions, combinations, and simplification made without departing from the spirit and principle of the present invention, all should be equivalent replacement modes, and they are all included in the protection scope of the present invention.

The invention claimed is:

1. A Staurosporine-Emamectin benzoate suspending agent, comprising Staurosporine and Emamectin benzoate, wherein a mass ratio of Staurosporine to Emamectin benzoate is 4-9:6-1.

2. The Staurosporine-Emamectin benzoate suspending agent according to claim 1, wherein:

the mass ratio of Staurosporine to Emamectin benzoate is 7-9:3-1.

3. The Staurosporine-Emamectin benzoate suspending agent according to claim 1, wherein:

the mass ratio of Staurosporine to Emamectin benzoate is 4:6, 7:3 or 9:1.

4. The Staurosporine-Emamectin benzoate suspending agent according to claim 1, wherein:

the Staurosporine-Emamectin benzoate suspending agent also contains at least one of a wetting agent, a dispersing agent, a wetting and dispersing agent, a thickener, a stabilizer, an antifreeze, a pH adjuster, and a defoamer; and the total mass of the effective ingredients Staurosporine and Emamectin benzoate in the Staurosporine-Emamectin benzoate suspending agent accounts for 2% to 4% of the mass percentage of the Staurosporine-Emamectin benzoate suspending agent.

5. The Staurosporine-Emamectin benzoate suspending agent according to claim 4, comprising the following components in terms of mass percentage: 22.50%-40% of 8% Staurosporine emulsifiable concentrate, 0.4%-1.8% of 50% Emamectin benzoate, 5% of the wetting and dispersing agent, 1% of the thickener, 0.5% of the stabilizer, 1% of the antifreeze, 0.5% of the pH adjuster, and 0.2% of the defoamer, with the balance being deionized water; wherein the mass ratio of Staurosporine to Emamectin benzoate in the Staurosporine-Emamectin benzoate suspending agent is within the range of 4-9:6-1; and 8% Staurosporine emulsifiable concentrate consists of the following components in terms of mass percentage: 8% Staurosporine, 5% polysorbate 80, and 87% n-butanol.

6. The Staurosporine-Emamectin benzoate suspending agent according to claim 4, wherein:

the wetting and dispersing agent is sodium dodecylbenzene sulfonate;

the thickener is xanthan gum;

the stabilizer is linseed oil;

the antifreeze is ethylene glycol;

the pH adjuster is glacial acetic acid; and the defoamer is a polyether defoamer.

7. A method for preparing the Staurosporine-Emamectin benzoate suspending agent according to claim 5, comprising the following steps: uniformly mixing the 8% Staurosporine emulsifiable concentrate and the 50% Emamectin benzoate, and then adding a wetting and dispersing agent, a thickener, a stabilizer, an antifreeze, a pH adjuster, a defoamer and deionized water, and stirring evenly to obtain a mixture; and grinding and pulverizing the mixture to obtain the Staurosporine-Emamectin benzoate suspending agent.

8. A method for controlling a pest using of the Staurosporine-Emamectin benzoate suspending agent according to claim 1, comprising:

spraying Staurosporine-Emamectin benzoate suspending agent on the front and back sides of the leaves and stems.

9. The method according to claim 8, wherein the pest is *Spodoptera exigua*.

* * * * *